United States Patent [19]

Fray

[11] Patent Number: 4,800,069

[45] Date of Patent: Jan. 24, 1989

[54] ZINC RECOVERY FROM FURNACE DUST

[75] Inventor: Derek J. Fray, Trumpington, England

[73] Assignee: National Research Development Corporation, London, England

[21] Appl. No.: 99,677

[22] Filed: Sep. 21, 1987

Related U.S. Application Data

[63] Continuation of Ser. No. 883,920, Jul. 10, 1986, abandoned.

[30] Foreign Application Priority Data

Jul. 24, 1985 [GB] United Kingdom ................ 8518746

[51] Int. Cl.$^4$ ...................... C01G 11/00; C01G 21/16; C01G 9/04
[52] U.S. Cl. ...................................... 423/97; 423/107; 75/25
[58] Field of Search ...................... 423/91, 94, 97, 103, 423/107, 108, 491, 494; 75/25, 111, 113, 114, 112, 120, 121, 9

[56] References Cited

U.S. PATENT DOCUMENTS

| | | | |
|---|---|---|---|
| 3,499,754 | 3/1970 | Colombo et al. | 75/113 |
| 3,649,245 | 3/1972 | Colombo et al. | 75/9 |
| 4,092,152 | 5/1978 | Borbely | 423/107 |
| 4,259,106 | 3/1981 | Aaltonen et al. | 75/25 |

FOREIGN PATENT DOCUMENTS

| | | | |
|---|---|---|---|
| 0097144 | 12/1983 | European Pat. Off. | |
| 2903971 | 8/1980 | Fed. Rep. of Germany | 75/25 |
| 1129885 | 1/1957 | France | |
| 2510141 | 1/1983 | France | |
| 84329 | 8/1982 | Luxembourg | |
| 2064497 | 10/1980 | United Kingdom | |
| 2125019 | 8/1982 | United Kingdom | |
| 2150923 | 7/1985 | United Kingdom | |
| 2178419 | 2/1987 | United Kingdom | 423/107 |

*Primary Examiner*—Robert L. Stoll
*Attorney, Agent, or Firm*—Nixon & Vanderhye

[57] ABSTRACT

Zinc and other metals are recovered form strongly bound zinc ferrite compounds in furnace dust. To the dust is added 1 weight percent of free zinc oxide unless already present. The dust is treated for 1 hour at 750C with a 20:1 air:chlorine mixture whereby the zinc, lead and cadmium are removed from the dust as volatilised chloride.

11 Claims, No Drawings

ZINC RECOVERY FROM FURNACE DUST

This application is a continuation of Ser. No. 883,920 filed July 10, 1986, now abandoned.

This invention relates to zinc (and allied metals) recovery from furnace dust. Such dust may be collected from the flue of an electric-art steel-refining furnace, and typically contains zinc bound up in a form of zinc ferrite.

In the past, it has been possible to recover substantially all the zinc from such dusts by leaching with sodium hydroxide solution or chlorine/water mixtures.

Recently, it has been found that the above procedures only remove about 50-60% of the zinc and this is due to a change in the operating technique of electric-arc steel-making furnaces: oxygen lancing is now used during melt-down, raising the temperature and apparently causing the ferric oxide and zinc oxide to form a strong ferrite.

According to the present invention, zinc and allied metals are recovered from furnace dust by ensuring the presence in the dust of a non-ferrite zinc compound (i.e. adding such compound if absent), treating the dust with a halogen and an additional oxidant at an elevated temperature and recovering the zinc and allied metals in the form of volatilised halide, said elevated temperature being at least: 624C where the halogen is iodine; 650C where the halogen is bromine; and 732C where the halogen is chlorine. The halogen is preferably chlorine, and the temperature is preferably at least 740C and preferably below 780C. The allied metals are cadmium and lead. Their halides can act as described in the presence of zinc.

The non-ferrite zinc compound may be a compound convertible to zinc chloride on treatment with the halogen and additional oxidant, such as zinc oxide, or may actually be zinc chloride; it is preferably initially present in an amount of 0.1 to 10 weight percent of the dust, more preferably ½ to 2 percent.

The additional oxidant may be oxygen or air, and may be present (assuming they are both in the gas phase, as is preferred) in a partial pressures ratio of from 2 to 10 parts of oxygen or its equivalent (i.e. for example air would be 10 to 50 parts) to 1 part of halogen.

The treatment may last from 10 to 100 minutes, preferably 40 to 90 minutes.

The invention will now be described by way of example.

A sample of furnace dust was obtained from a British Steel Corporation electric arc furnace in which steel (containing impurities such as zinc) had been refined using oxygen, which had been applied even during melt-down. This sample was found to contain about 1 weight percent zinc oxide, and therefore it was not necessary to add any.

The sample was heated to 750C for 1 hour, and was subjected throughout to a draught containing 20 parts air and 1 part chlorine. The draught carried away with it zinc chloride vapour from the mixture. The zinc chloride vapour was condensed out on a cold finger held below 730C, and 99.9 percent of the zinc in the original sample was recovered in this way. Of the iron in the original sample, 100.0 percent remained in the residue.

I claim:

1. A process for recovering a metal selected from the group consisting of zinc, cadmium and lead from furnace dust, said process comprising the steps of:
    adding to the dust a zinc compound selected from the group consisting of zinc oxide and zinc chloride unless the dust already contains a compound selected from the group consisting of zinc oxide and zinc chloride;
    treating said dust at an elevated temperature with a halogen and an additional oxidant selected from the group consisting of air and oxygen; and
    recovering the metal in the form of volatilized metal halide;
    said elevated temperature being at least 624 degrees C when said halogen is iodine;
    at least 650 degrees C when said halogen is bromine; and
    at least 732 degrees C when said halogen is chlorine.
2. A process according to claim 1, wherein said halogen is chlorine.
3. A process according to claim 2, wherein the temperature is at least 740 degrees C.
4. A process according to claim 2 or 3, wherein the temperature is below 780 degrees C.
5. A process according to claim 1, wherein said zinc coupound is zinc chloride.
6. A process according to claim 1, wherein said zinc compound is zinc oxide.
7. A process according to claim 1, wherein said zinc compound is initially present in an amount of 0.1 to 10 weight percent of the dust.
8. A process according to claim 7, wherein said compound is present as ½ to 2 weight percent of the dust.
9. A process according to claim 1, wherein said additional oxidant is air.
10. A process according to claim 1, wherein said halogen and said additional oxidant are both in the gas phase in a partial pressures ratio of 2 to 10 parts of oxygen or its equivalent to 1 part of halogen.
11. A process according to claim 1, wherein the treatment lasts from 40 to 90 minutes.

* * * * *